S. H. GILSON.
HYDROAEROPLANE.
APPLICATION FILED OCT. 23, 1912.
1,057,999.
Patented Apr. 1, 1913.
9 SHEETS—SHEET 1.
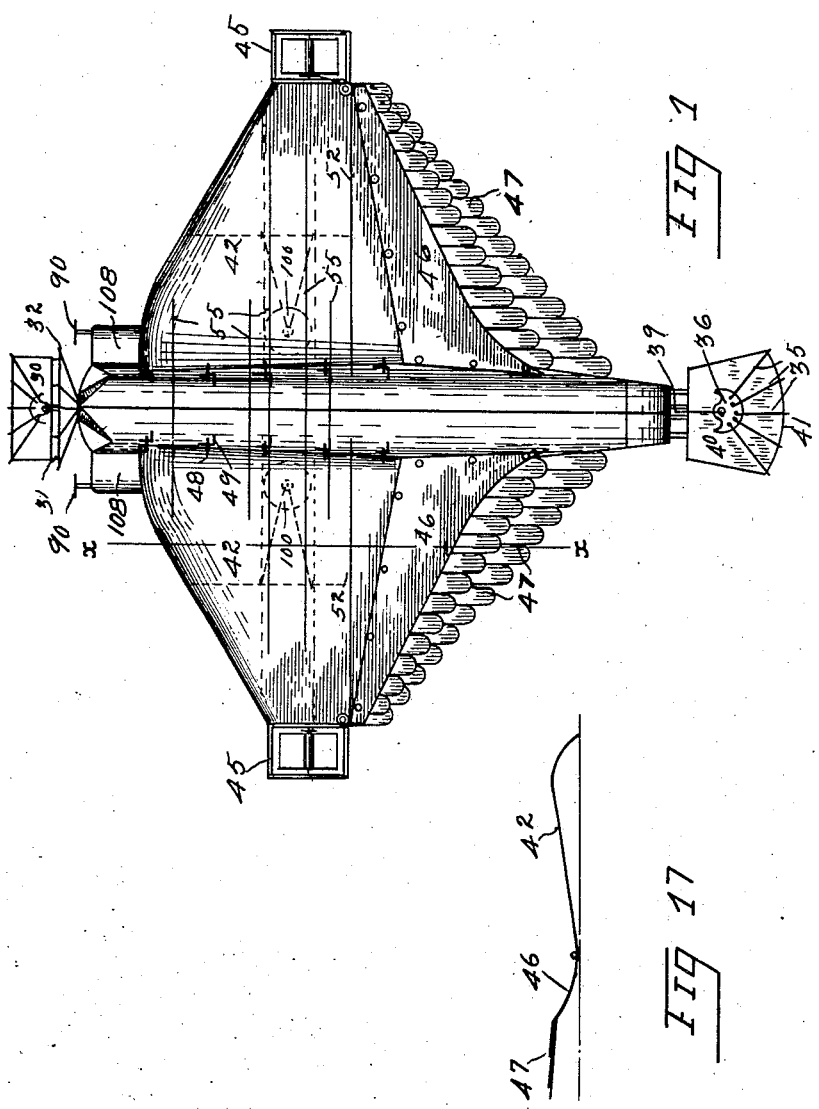
WITNESSES
INVENTOR
ATTORNEY S. H. GILSON.
HYDROAEROPLANE.
APPLICATION FILED OCT. 23, 1912.
1,057,999.
Patented Apr. 1, 1913.
9 SHEETS—SHEET 2.
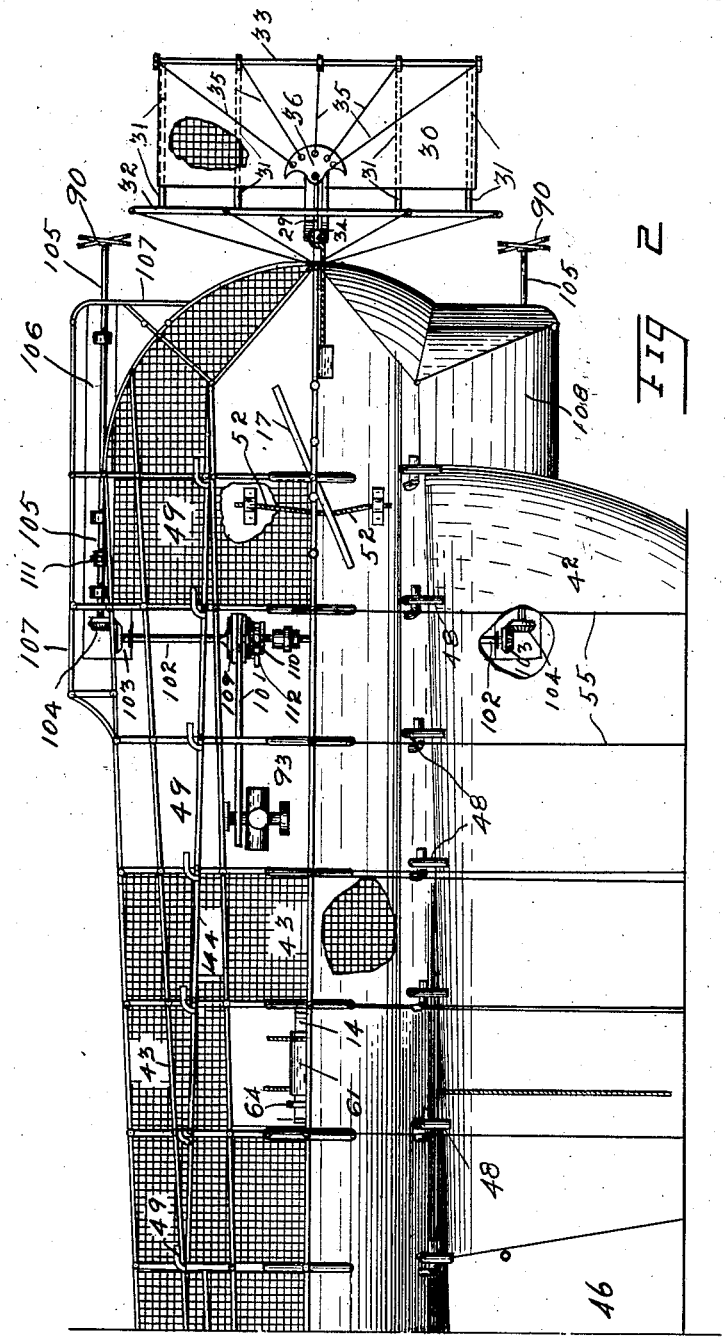
WITNESSES
F L Horspool
Ben P. Corum
Samuel H. Gilson
INVENTOR
By J. M. Thomas
ATTORNEY.

S. H. GILSON.
HYDROAEROPLANE.
APPLICATION FILED OCT. 23, 1912.
1,057,999.
Patented Apr. 1, 1913.
9 SHEETS—SHEET 3.
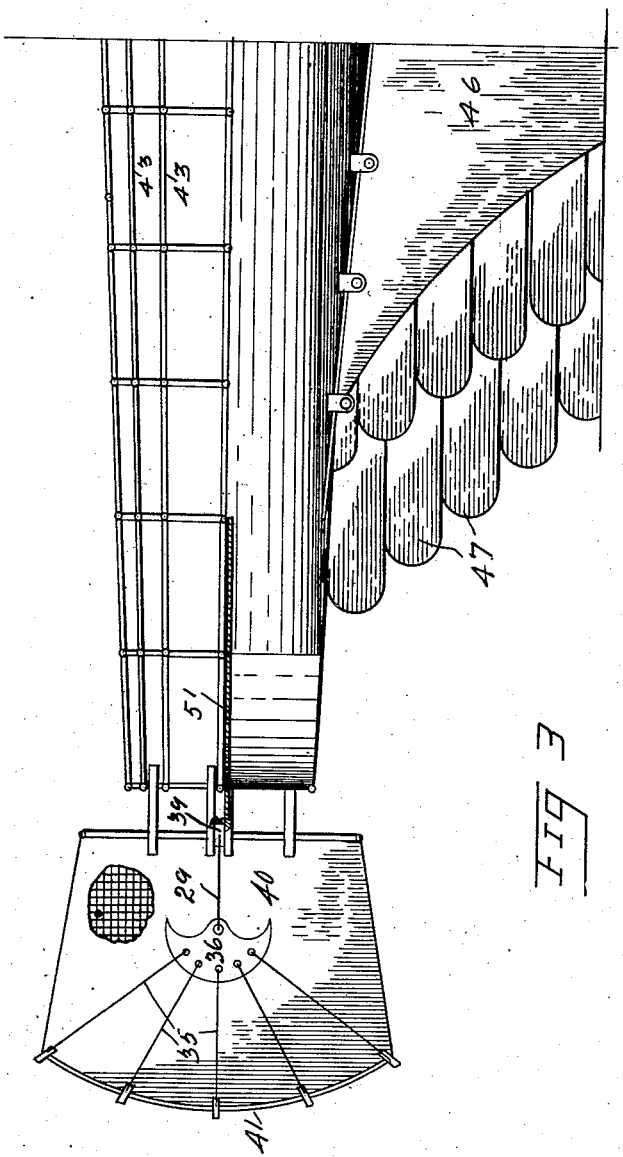

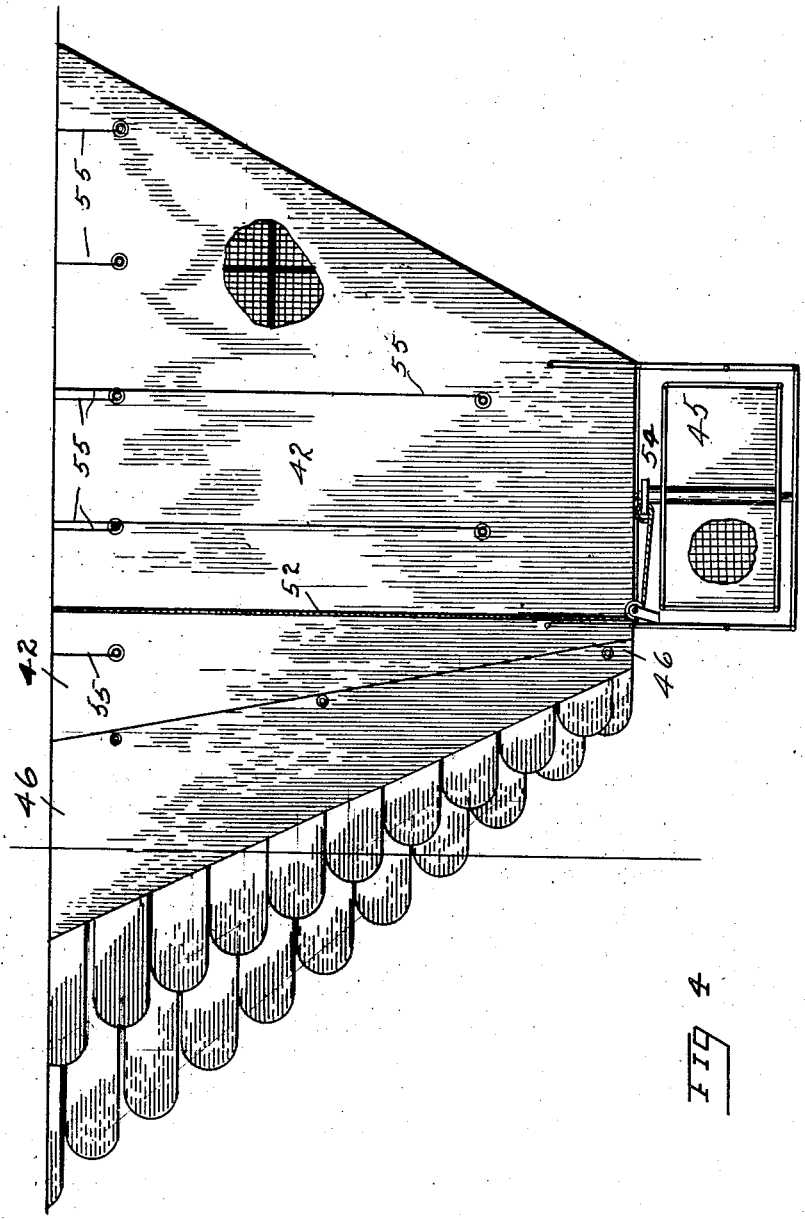

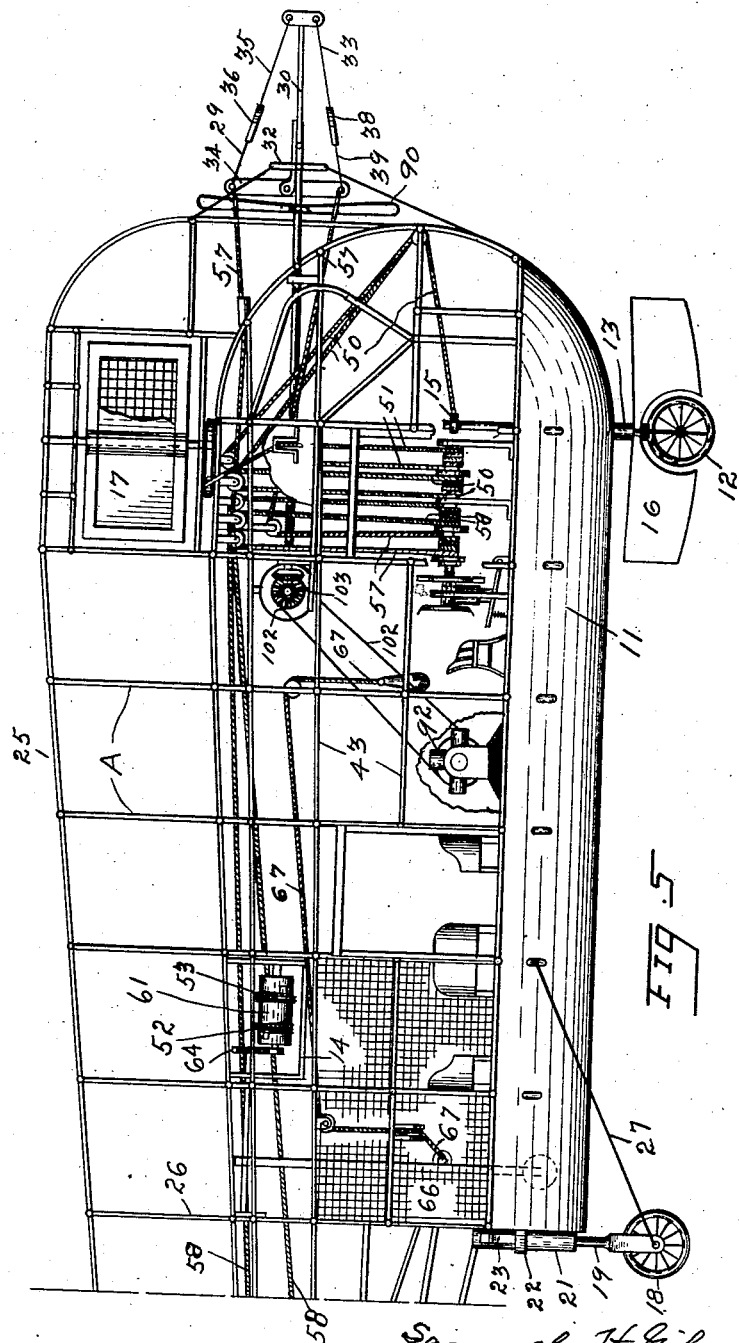

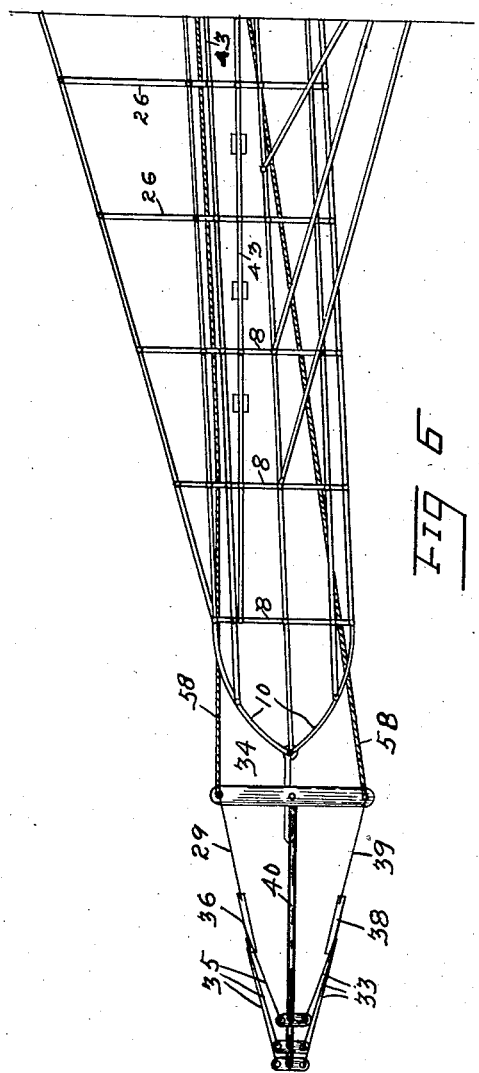

S. H. GILSON.
HYDROAEROPLANE.
APPLICATION FILED OCT. 23, 1912.
1,057,999.
Patented Apr. 1, 1913.
9 SHEETS—SHEET 7.
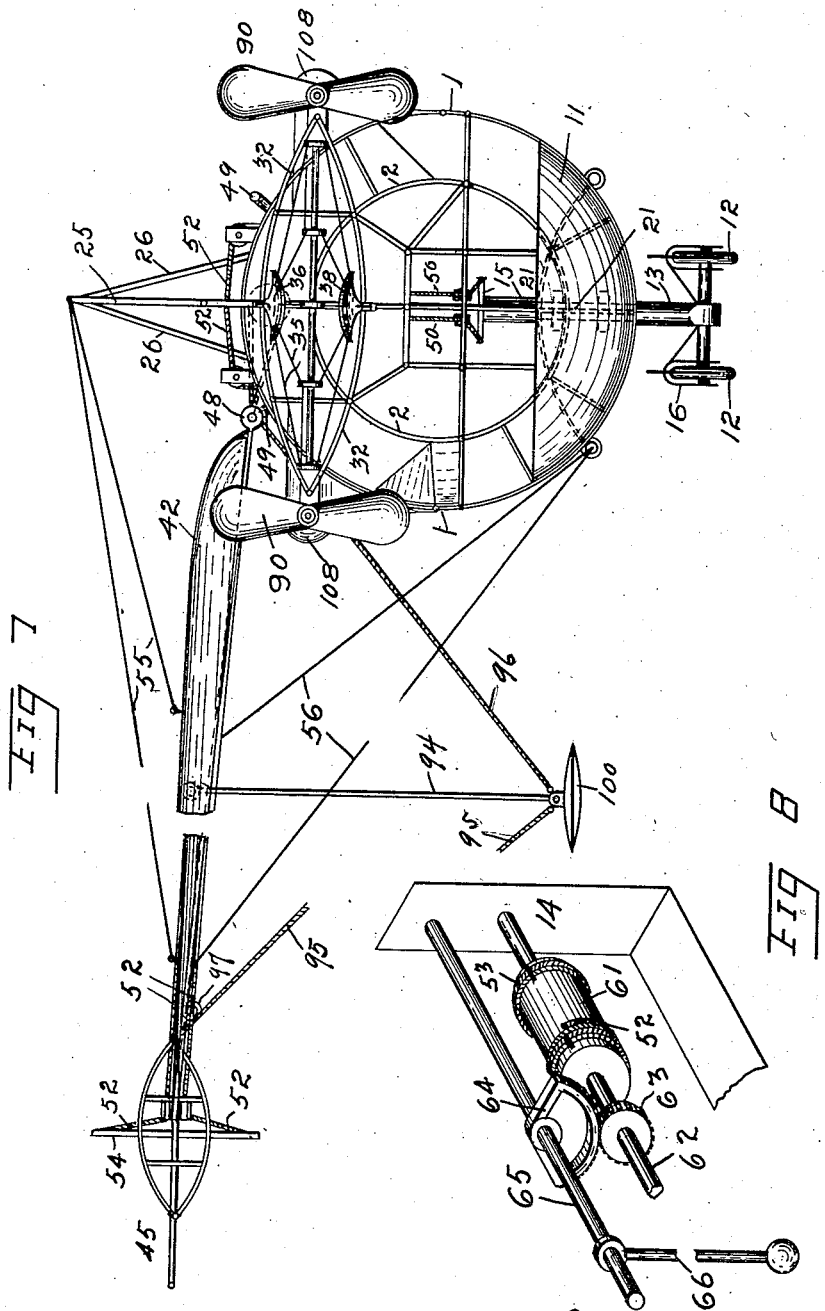

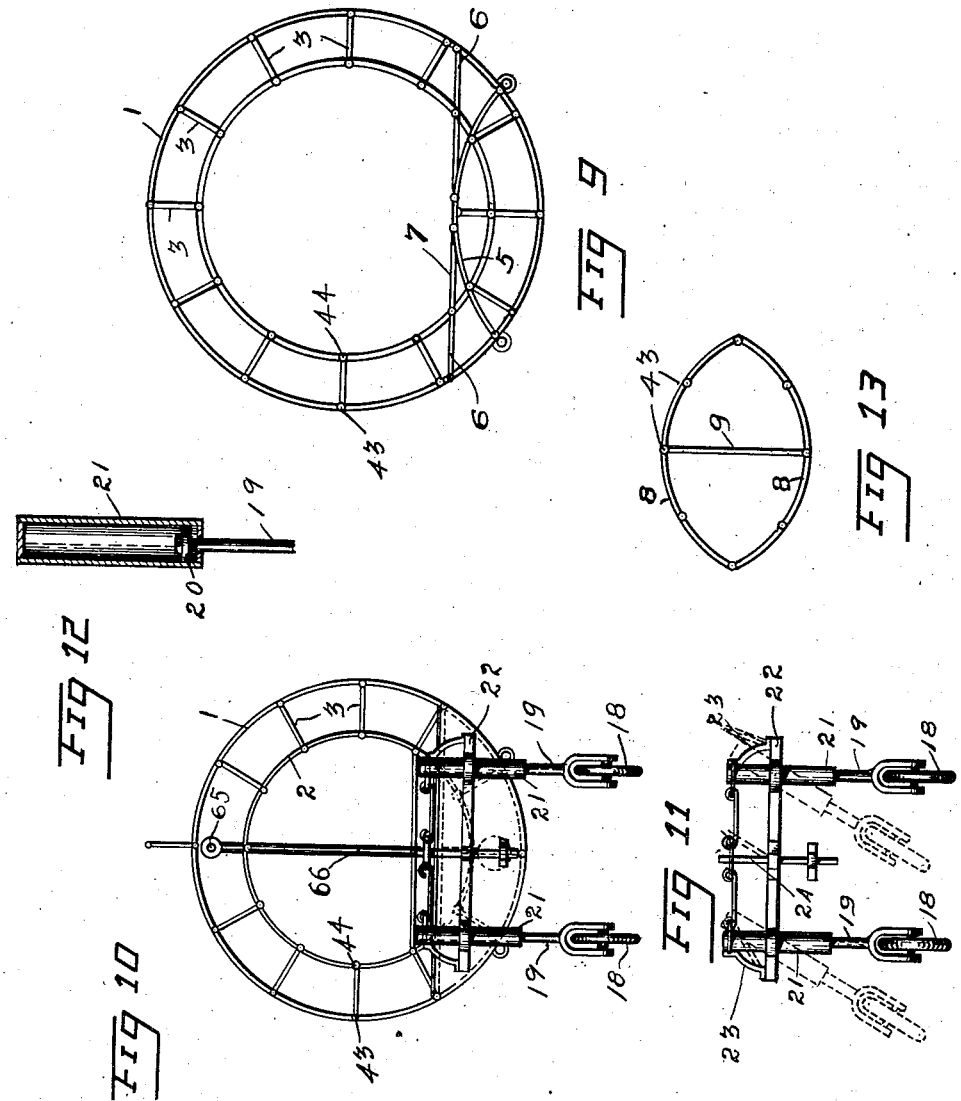

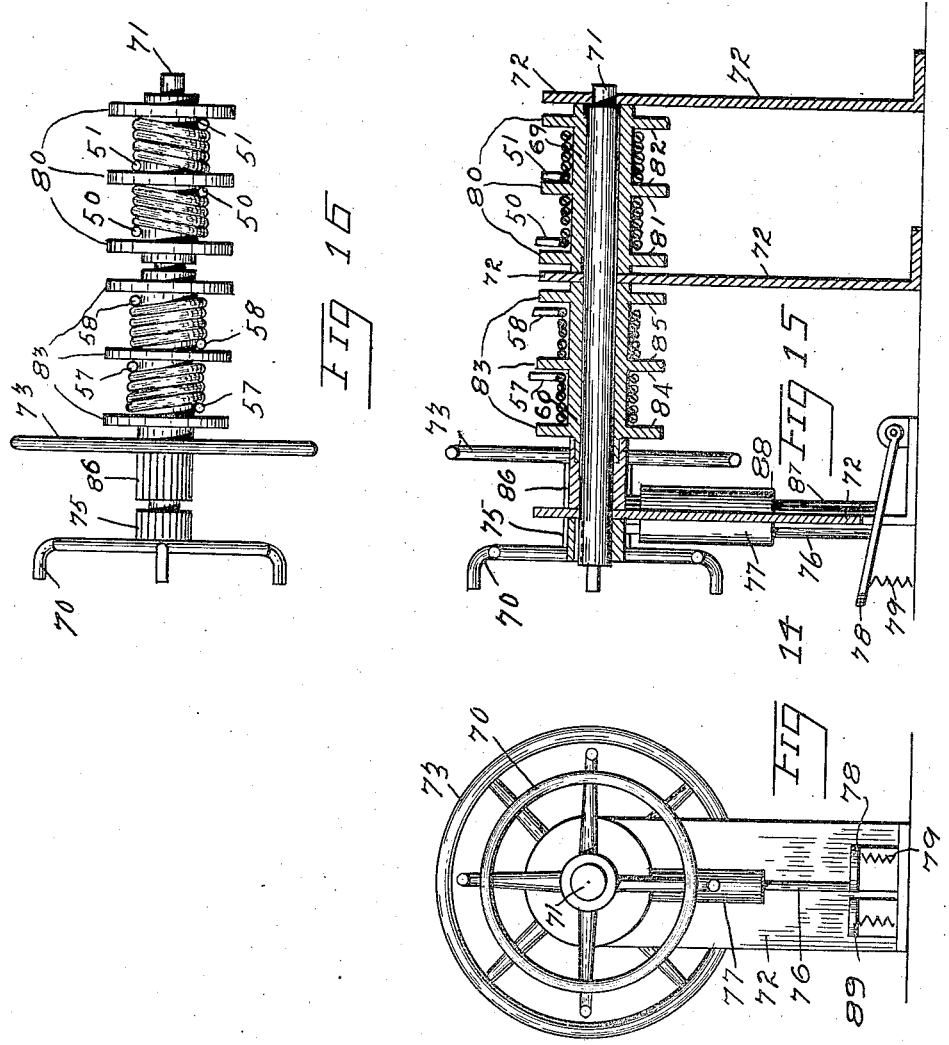

UNITED STATES PATENT OFFICE.

SAMUEL H. GILSON, OF SALT LAKE CITY, UTAH.

HYDROAEROPLANE.

1,057,999.                Specification of Letters Patent.        Patented Apr. 1, 1913.

Application filed October 23, 1912. Serial No. 727,456.

*To all whom it may concern:*

Be it known that I, SAMUEL H. GILSON, a citizen of the United States, residing at Salt Lake City, in the county of Salt Lake and State of Utah, have invented certain new and useful Improvements in Hydroaeroplanes, of which the following is a specification.

My invention relates to heavier than air flying machines, and has for its purpose to provide a device for carrying passengers through the air, which device may arise from or alight on the ground or water, and which is strongly built and light in weight, and which is provided with a form and manner of wing construction which will require less propelling power than is at present used, and which will remain in flight for a longer period of time when the propelling power is cut off. These and other objects I accomplish with the device shown in the accompanying drawings and described in the specifications forming a part of this application and as pointed out in the appended claims, it being understood that slight changes in the manner and form of construction may be resorted to within the scope of the claims without departing from the spirit of the invention.
With these objects in view my invention consists of the novel construction and combination of parts which will be hereinafter described and claimed.

In the drawings Figure 1 is a plan view of the assembled device, much diminished from the other figures. Fig. 2 is a plan view of the body of the device with the covering removed from one side thereof and showing the covering and a portion of the wing of the other side, parts cut away to show the interior mechanism and structural formation. Fig. 3 is a plan view of the tail section of the device shown as coinciding when placed contiguous with Fig. 2, and with the covering removed from one side. Fig. 4 is a plan view of the outer end portion of the wing shown in Figs. 2 and 3 and drawn to coincide with Figs. 2 and 3, parts cut away to show the structural formation. Fig. 5 is a side elevation of the body of the device with the wing removed, portions of the covering omitted to show interior mechanism. Fig. 6 is a side elevation of the tail portion of the device drawn to coincide with Fig. 5; covering entirely removed. Fig. 7 is a front elevation of the device with one wing in place, parts cut away, and with the float lowered and at rest on the water. Fig. 8 is a view in perspective of the lateral stabilizing mechanism. Fig. 9 is an elevation of one of the circular trusses used as a brace in the body of the device. Fig. 10 is a rear elevation of one of the truss braces and rear wheels of the device, with some of the cushioning springs shown in dotted lines. Fig. 11 is a view of the rear wheels and cushioning members removed from the truss brace to which they are attached and shifted to the left in dotted lines as would occur in skidding to the right. Fig. 12 is a section through one of the cushioning cylinders and a portion of the wheel fork standard. Fig. 13 is an elevation of one of the truss braces used in the tail section of the device. Fig. 14 is an elevation of the controlling hand wheels and foot pedals. Fig. 15 is a vertical section through the wheels and drums. Fig. 16 is a plan view of the hand wheels with control shafts, ratchets and drums. Fig. 17 is a diagrammatic section on line $x$ $x$ of Fig. 1.

My device consists of a body and tail section made in tubular form and retained in that form by longitudinally and laterally placed truss braces, some of which are within and others without the structure and with laterally extended wings of special construction and form. Said wings are attached to the braces in said body and tail sections, and are so constructed as to sustain flight with less power and to carry more weight proportionate to said power than has previously been accomplished. Also my device is so braced that the strain of carrying weight and alighting on land or water will not injure the device. The body portion is in hollow tubular form braced within by a number of circular trusses A, and longitudinal braces 43 and 44. Each of said trusses consists of tubes bent to form circular bands 1 and 2, concentrically spaced apart by radially disposed braces 3. Said trusses A are spaced from each other and securely held in place by the longitudinal braces 43 and 44. Within each of said trusses A are also the arc braces 5 and the tangential braces 6. The floor 7 of my device is supported by the arc braces 5 and rests on the tangential braces 6. In the tail section of my device the tubular form is not so nearly circular but is formed by two arc shaped trusses 8 and the vertically placed braces 9. Some of said longitudinal braces 43 extend longitudinally through the tail braces and to the rear of the device where they support the arc shaped braces 10 to which is pivotally secured the rear rudder plane 40 to be hereinafter explained.

That portion of the body of the structure below the floor 7, is covered with water proof material and forms a keel or water tight compartment 11 in the under part or body of the device, which is used as a buoyant element when the device is on the water. (See Figs. 5 and 8). The rudder wheels 12 are secured to the lower portion of the body section of the device adjacent one of the said truss braces A by means of a standard 13 which is rotatable within the bearing cylinder 21. Said cylinder is secured to the arc brace 5 and tangential braces 6 in said truss A. Said standard 13 is upwardly extended through the cylinder 21 and has a cross piece 15 secured thereto, forming lever arms to which the direction cable 51 of the device is secured. In alinement with and inclosing said wheels 12 and secured on said standard 13 which acts as a pivot therefor, are the rudders 16. Said rudders 16 are given the same longitudinal direction as the top rudder 17 which is pivoted above the body portion of the device. Rudders 16 and 17 are used to give lateral direction to the device when on the water or in the air. When on the water the rudders 16 control, and are used to turn the device to the right or left. On the said truss A at the rear end of the body portion of the device are fastened the rear wheels 18. Each of said wheels is journaled in a fork 19, on the upper portion of which is secured a piston 20, and the lower portion of each fork is braced by a stay 27. Each of said pistons is made to operate within an air cylinder 21 similar in form to the one on the front wheels, which is firmly held in place in the cross head 22 and normally in vertical position by the springs 23 and 24. Said cylinders 21 with the pistons 20 provided therein, form air cushions for said wheels 18. The springs 23 and 24 allow the lower end of the forks 19, and said wheels, to be moved from a vertical position, laterally on the pivotal connection of the cylinders to aid in alighting, with the rear end portion of my device the lower end striking the ground first. Such construction is often desirable should the device be skidding or bearing to the right or left when alighting.

On the front of my device is secured the elevation rudder which consists of a plane 30 normally parallel with the general plane of the device. Said plane 30 has resilient or spring like strips 31 therein which are rigidly secured in a cross brace 32. On the free end of said strips 31 is provided the flexing strip 33 which strip forms the front or cutting edge of my rudder. The flexing cable 57 is secured to a centrally fulcrumed lever 34 which is vertically pivoted adjacent said plane 30. Cords 35 connect the cable disk 36 with the upper side of said flexing strip 33. Cords 37 connect the lower edge of said flexing strip 33 and similar cable disk 38. Cords 29 and 39 connect said lever 34 and the respective cable disks 36 and 38. The purpose being that when said lever 34 is moved on its fulcrum, the front edge of said plane 30 will be moved from its normal position, either up or down as said lever is moved. When the pull of the said cables 57 is released from said lever 34, the resilient strips 31 will return said plane 30 to its normal position. The rear rudder 40 is similarly constructed except as to size and form, it being made longer and wider and the rear edge preferably in curved form as shown at 41. The operating cables 57 and 58 leading to said planes 30 and 40 are secured to and wound on the same drum 60 but in different directions in order that when said plane 30 is to flex downward the said plane 40 is flexed upward and in the reverse directions respectively, and furnish the vertical control to the device, and thereby to move it from one altitude to another. The wings are alike on each side of the device and each wing consists of the upwardly curved plane 42, to which is secured the upwardly curved auxiliary wing 46 with the resilient members 47 firmly attached thereto. The said wings are detachably fastened to the body portion of my device by means of the eyes 48 engaging with the hooks 49 which are secured to the angle of incidence brace rods 144, which are fastened on the outer side of a number of said truss braces A. There is one of said brace rods 144 on each side of the device and of length sufficient to reach from near the front, to near the rear end of the main body of the device; and each is inclined downward in the distance about the space between two of said braces 43. In the outward tip of each wing is provided an aileron 45 by means of which the lateral stability of my device is maintained. Said ailerons coact to raise or lower the respective sides of the device, and each is pivoted within a frame provided on the tip of the main plane.

The angle of incidence of the ailerons is changed and maintained by means of the cables 52 and 53. Each of said cables 52 and 53 are wound around a drum 61, which is fastened on a horizontal shaft 62, that is journaled in a frame 14 fastened in the upper part of the device and centrally fore and aft. Also secured on said shaft 62 and rotating therewith is a pinion 63, the teeth of which mesh with the teeth of a segment gear 64. Said segment gear is secured on a rock shaft 65 which is journaled in bearings fastened to some of said truss braces A.

On one end of said rock shaft 65 is provided a depending weighted pendulum arm 66 by which said shaft is rocked or partially rotated. A device for warping the ailerons of an aeroplane somewhat similar was patented by me in July, 1910 and was numbered 965,771. Cords 67 are fastened to said pendulum arm 66 and carried over pulleys to where the operator is seated, by means of which the movement of the pendulum may also be controlled by the operator. Said cable 52 has the ends thereof fastened to the ends of a lever 54 and the intermediate portion is wound several turns around and fastened on said drum 61 by means of which cable the angle of incidence of the aileron on the right side of the device is changed. Said cable 53 is also similarly wound on and secured to said drum 61 and has its ends fastened to a like lever on the aileron at the left side of the device in order that the rotation of said drum 61 will change the angle of incidence of both ailerons but in the reverse direction by which means one wing of the device is raised and the other wing lowered, by the one movement of the drum. Each wing is firmly held in fixed tangential relation to the body of the device by the stay wires 55 and 56. Said wires 55 are fastened at their inner ends to the horizontal truss brace 25 which is fastened to the upwardly extended radial braces 3 and their side braces 26. Said wires 56 are fastened at their inner ends to the truss braces A.

The control of my device consists of a hand wheel 70 secured on the end of a shaft 71 which is journaled in vertical standards or bearings 72, and another hand wheel 73 which is fastened on one end of a drum 60, which drum and wheel are also carried on said shaft 71. The said hand wheel 70 has a ratchet 75 which forms the hub of said wheel and which ratchet is engaged by a detent 76 slidably carried in a case 77 and pivoted to a foot pedal 78. Said detent 76 is normally held in engagement with said ratchet by means of a spring 79. Outwardly extended flanges 80 are provided on said drum 69 to form cable cases 81 and 82 on which the said cables 50 and 51 are respectively wound and fastened. Said drum 60 has outwardly extended flanges 83 to form cable cases 84 and 85, on which said cables 57 and 58 are respectively wound and fastened. The rotation of said hand wheel 73 will move said cables 57 and 58, and the rotation of said hand wheel 70 will move said cables 50 and 51. The hub of said hand wheel 73 is formed as a ratchet 86 which rotates with said wheel. The teeth of said ratchet 86 are engaged by a detent 87 which is slidably carried in a case 88 that is fastened to one of said standards 72 and on the opposite side is fastened said case 77. Said detent 87 is pivoted at the lower end to another foot pedal 89, which is pivoted adjacent said pedal 78. Said detents 76 and 87 are to lock said hand wheels 70 and 73 against unintentional rotation.

In the diagrammatic Fig. 17 the position and shape of the portions of each wing are shown more clearly than in the other figures. The main wing 42 has its edges in a plane as shown in Fig. 7, immediately back of the front edge, the wing curves upward and then downward to the general plane thereof, and to the rear edge of this portion of the wing is secured the auxiliary wing 46, which auxiliary wing is also curved upward above the general plane, and with the rear edge thereof preferably in a lateral curved line and to which lateral curved line edge a plurality of resilient members 47 are secured, each parallel with the body of the device and in transverse alinement with the front edge of the main wing and the general plane. The purpose of the several wing sections and of their form and construction being, that when the device is formed through the air there will be a compression of air under the curved portion of the main wing, and the air in escaping to the rearward, will pass under the curved auxiliary wing 46 and strike the said resilient members 47. The air in escaping from under the said members 47 will cause the resilient tips or the free end portions thereof to bend or curve upward and with a tendency to force the device ahead.

My purpose is to construct a wing similar to the wing of soaring birds and to supply, with the resilient tips 47 of the members 46, the wing feathers on the rear side of the birds wings and to thereby secure enough forward movement from the resiliency in said tips as acted upon by the escaping air to prevent a vertical fall and to alight safely should the propellers stop and the momentum given the device by them be much diminished or entirely cut off.

The power plant of my device consists of an engine 92 in the right and a similar engine 93 in the left side of the device secured to the floor 7. Both connected by a belt 101 to a lateral counter-shaft 102 in order that said counter-shaft 102 may be rotated by either or both of said engines. On each end of said counter-shaft 102 is provided a bevel gear 103, which meshes with bevel gears 104 which are secured on the ends of the propeller shafts 105. Said counter-shafts 102 and propeller shafts 105 are journaled in bearings which are fastened on bed plates 106. Said bed plates are secured on bracket braces 107 which are attached to some of said truss braces A and covered and housed as shown at 108 in Fig. 2. On the front end of each propeller shaft is secured a propeller 90. Said counter-shaft 102 is provided with two loose pulleys 109, and a friction clutch 110 adjacent each of said pulleys, in order that either engine may be thrown out of or into engagement with said countershaft as desired. On each propeller shaft is fastened a friction clutch 111 by means of which either or both propellers may be thrown out of or into motion. The levers to move the friction clutches 110 are shown at 112, those for the propeler shafts are not shown.

On each side of the device, and centrally located on the under side of each of the main wing sections, is pivoted a dependable float 100; preferably circular in form and made of two convex disks secured together at the peripheries, the upper of said disks having a central portion formed concave. Two tubes 94 are pivoted at one end to the under side of the main wing section and their other ends are fastened together to form a V-shaped link brace which is pivoted to said float centrally within the concavity formed in the upper side thereof. Said V-shaped link has cords 95 and 96 attached at the lower end and at opposite sides thereof. Said cord 95 is made to operate over a pulley 97 secured near the outer end of said main wing and over a pulley not shown, secured to one of said longitudinal braces 43. Said cord 96 is made to run over a pulley not shown secured to the same longitudinal brace 43 where it is fastened. The purpose of said floats and their operation is as follows: When my device is at rest on the water the floats 100, are dropped into position as shown in Fig. 7 with the cords 95 and 96 fastened to form stays and maintain or hold said float in vertical position. Each of said floats rests on the surface of the water and insures lateral stability to the device. When the device is to be operated, either on the water or in the air, the cord 95 is loosened from said tie and allowed to move over the pulleys 97 and 98 and the cord 96 is drawn inward over the pulley 99, and thereby the floats are brought into the position shown in dotted lines in Fig. 1, where they offer the least resistance and in that position they are held until needed to again rest upon the water.

The control and operation of my device is as follows: To move on the water, the water proof keel 11 will float the device, with the wheels and front lower rudders 16 submerged, motion being imparted to the propellers 90 by the engines 92 and 93, or either of them, said propellers will engage the surrounding air and the device will be forced ahead. Wishing to turn to the right or left, for illustration say to the right, the free end of the foot pedal 78 is pressed down, this disengages the detent 76 from the ratchet 75 and leaves the hand wheel 70 free to rotate on its axis. By turning said hand wheel to the left and the said cables 50 and 51 are moved longitudinally and the rudders 16 and 17 are turned to the right. A reverse turn of said hand wheel 70 will direct the device to the left, and releasing the foot pedal 78 when the rudders are turned to the left will allow the detent 76 to engage the ratchet 75 and hold the rudders in that position and the device will run in a circle to the left. With the rudders set parallel with the device, and wishing to arise the free end of the other foot pedal 89 is depressed, this will disengage the detent 87 from the ratchet 86 and leave the hand wheel 73 free to be rotated on its axis. By turning the said wheel to the right the cables 57 and 58 will be moved longitudinally and the front edge portion of plane 30 will be curved upward, and the rear edge portion of the plane 40 will be curved downward, this will direct the device upward out of the water and into the air. To continue to rise, the pressure on the foot pedal 89 may be removed, if desired. This will allow the detent 87 to engage the ratchet 86 and lock the hand wheel 73 which will hold the said planes 30 and 40 in their upward and downward curved form respectively. When the desired altitude has been attained, the said foot pedal 89 is depressed to release the said hand wheel 73, when so released said wheel and its connections are free to move and the resilient strips 31 in said planes 30 and 40 will bring the said planes 30 and 40, which are the elevating rudders, to their normal and horizontal position, this will keep the device at that altitude. If the air currents tilt the device from a lateral horizontal position, for illustration say that the right wing is raised and the left wing is lowered, the pendulum 66 will be moved to the left and the segment gear 64 turned to the left. Said movements of the pendulum and segment gear will rotate said drum 61 and move the cables 52 and 53 longitudinally, and this movement will have pulled the front of the aileron 45 on the right wing down and the front of the aileron in the left wing up. If the device is moving forward, the air striking said ailerons while in this position, will lower the right wing and raise the left wing and bring the device back to the lateral horizontal position. If at any time the said pendulum should from any cause have a tendency to oscillate, this may be prevented by means of said cords 67. Should it be necessary or desired at any time to hold the device with one wing raised and the other lowered as in banking on a turn, say to the left, the said cord 67 on the right is pulled, thus drawing the pendulum to the right. Holding it in that position will hold the front of the aileron in the right wing up and the front of the aileron in the left wing down. If the said cord 67 is released the pendulum will immediately swing beyond the vertical and reverse position of the ailerons and bring the device to a lateral horizontal position.

The planes, wings and body of the device are each covered with wires crossed to form a mesh or screen, which is covered with thin silk, cloth or strong paper, and cemented together with shellac, rubber or other water proof cement.

Having thus described my invention I desire to secure by Letters Patent and claim:—

1. A hydro-aeroplane consisting of a covered body; a buoyant element in a portion of said body; main wings tangentially secured on opposite sides of said body consisting of a covered plane curved upward to form a concavity near the front edge thereof and being shaped as a triangle with the base attached to said body; an auxiliary wing provided on the rear edge of each of said wings and curved upward from the line of its attachment to said main wing; a plurality of resilient overlapping strips fastened to the rear edge of said auxiliary wings and parallel with said body; ailerons pivoted to the tips of said main wings; means to automatically change the angle of incidence of said ailerons; a plurality of propellers mounted on said body; and means to rotate said propellers to drive said body through the air.

2. A hydro-aeroplane consisting of a hollow body section; circular truss braces secured transversely therein; longitudinal braces in the shell of said body section and fastened on said truss braces; arc and tangential braces secured on said circular braces; a water proof covering on a portion of said body section to form a buoyant element; a wing tangentially secured on each side of said body section consisting of a plane curved upward to form a concavity near the front edge thereof; an auxiliary wing provided on the rear edge of said plane and curved upward from the line of attachment; a plurality of over-lapping resilient strips secured to the rear edge of said auxiliary wing, each parallel with the said body; ailerons pivoted to the tips of said first mentioned wings; means to automatically change the angle of incidence of said ailerons; a plurality of propellers mounted on said body section; and means to drive said propellers.

3. A hydro-aeroplane consisting of a covered body; a buoyant element in a portion of said body; a wing tangentially secured on each side of said body consisting of a plane curved upward to form a concavity near the front edge thereof; an auxiliary wing provided on the rear edge of said wing and curved upward from the line of attachment; a plurality of resilient strips fastened to the rear edge of said auxiliary wing, each parallel with said body; ailerons pivoted to the tips of said first mentioned wings; means to automatically change the angle of incidence of said ailerons; a plurality of propellers mounted on said body; and means to drive said propellers.

4. A hydro-aeroplane consisting of a covered body; a buoyant element in a portion of said body; a wing tangentially secured on each side of said body consisting of a plane curved upward to form a concavity near the front edge thereof; an auxiliary wing provided on the rear edge of said wing and curved upward from the line of attachment; a plurality of resilient strips fastened to the rear edge of said auxiliary wing, each parallel with said body; ailerons pivoted to the tips of said wings; means to automatically change the angle of incidence of said ailerons, which means consists of a rock shaft journaled in said body; a weighted pendulum provided on one end thereof; a segment gear secured on said rock shaft; a counter-shaft journaled adjacent said rock shaft; a pinion on said counter shaft having teeth which mesh with the teeth of said segment gear; a drum fastened on said counter-shaft; a cable partially wound on and secured on said drum, having its ends fastened to a lever which moves said ailerons on their pivots; and an adjustable float pivoted to the under side of said wing.

5. A hydro-aeroplane consisting of a covered hollow body; circular truss braces secured transversely therein; longitudinal braces in the shell of said body and fastened on said truss braces; arc and tangential braces secured on said circular braces; a water proof covering on a portion of said body to form a buoyant element; wings tangentially secured on opposite sides of said hollow body, each curved upward near the front edge thereof; an auxiliary wing provided on the rear edge of said wings and curved upward from the line of attachment; a plurality of resilient strips fastened to the rear edge of said auxiliary wing and parallel with said hollow body; ailerons pivoted to the outer ends of said first mentioned wings; means to automatically change the angle of incidence of said ailerons; an adjustable float pivoted to the under side of each of said first mentioned wings; a plurality of propellers provided on said hollow body and mounted on a horizontal shaft; a friction clutch on each of said shafts; means to rotate said propellers, said means consisting of a plurality of engines; a counter shaft journaled transversely in said hollow body; friction clutches on said counter shaft; loose pulleys on said counter shaft; belts connecting said clutches and said pulleys; a bevel gear on each end of said counter-shaft the teeth of which mesh with a bevel gear provided on each propeller shaft; a front and rear plane pivoted to said hollow body; resilient strips in said planes adapted to hold them normally in alinement and parallel with said hollow body; means coacting to bend the outer edge of one of said planes upward and the other downward, said means consisting of a shaft, a drum carried thereon; a hand wheel attached to said drum; and cables partially wound on said drums and attached at their ends to said last mentioned planes.

6. In a device of the class described the combination of a covered tubular body; a water proof covering on a portion thereof; a wing tangentially secured on each side thereof, and braced equi-distant from said water proof section; said wing consisting of a covered plane upwardly curved near its front edge; an auxiliary wing secured on the rear of said wing and curved upwardly from the line of attachment; a plurality of over-lapping resilient strips secured to the rear edge of said auxiliary wings; means coacting to change the angle of incidence of said ailerons; means to propel said device through the air, said means consisting of one or more propellers, and one or more engines to drive said propeller.

7. A hydro-aeroplane consisting of a frame formed as a hollow tubular body, an outer covering therefor of wire screen on which is cemented an envelop, the lower portion of which is water proof; upward curved main wings tangentially secured on opposite sides of said tubular body; an auxiliary wing attached to the rear of each main wing; a plurality of overlapping resilient strips secured to the rear edge of said auxiliary wings and parallel with said tubular body; a float pivoted to the under side of said main wing normally vertical and adjustable laterally; a transverse plane pivoted to the front end of said tubular body; resilient strips embedded in said plane; means to bend the outward portion of said plane upward and downward from the normal position; a rear horizontal plane having resilient strips inclosed therein; means to bend the outward edge of said plane above or below the normal position; ailerons pivoted in the outer ends of the first mentioned wings; means to change the angle of incidence of said ailerons, said means consisting of a rock shaft journaled in said body; a weighted pendulum provided on one end thereof; a segment gear on said rock shaft; a counter shaft journaled adjacent said rock shaft; a pinion on said counter shaft having teeth which mesh with the teeth of said segment gear; a drum fastened on said counter shaft; cables partially wound on and secured to said drum having their ends fastened to move said ailerons on their pivots; and means to propel said body through the air, which means consist of a plurality of power driven propellers.

8. A hydro-aeroplane consisting of a tubular body; circular truss braces secured transversely therein; longitudinal braces fastened on said truss braces; arc and tangential braces secured on said circular braces; a floor resting on said arc and tangential braces; a covering for said tubular body consisting of wire screen on which is cemented a water proof material; upward curved main wings tangentially attached to said body; an auxiliary wing provided on the rear of each of said main wings and curved upwardly from the line of attachment; a plurality of resilient strips secured to the rear of said auxiliary wings; an aileron pivoted on the end of each of said main wings; means to automatically change the angle of incidence of said ailerons; an adjustable float pivoted to the under side of each of said main wings; a plurality of propellers provided on said body; means to rotate said propellers, said means consisting of a plurality of engines each connected with and adapted to rotate said propellers; a front and a rear plane pivoted to said body; resilient strips in said last mentioned planes adapted to normally hold them in alinement and parallel with said body; means co-acting to bend the outer edge of one of said planes upward and the outer edge of the other downward, said means consisting of a shaft; a drum carried on said shaft; a hand wheel attached to said drum; cables partially wound on said drum and attached at their ends to the said last mentioned planes.

9. In a device of the class described the combination of a hollow body section; circular truss braces transversely secured therein; longitudinal braces in the shell of said body section and secured on said truss braces; arc and tangential braces secured on said circular braces; a water proof covering on a portion of said body section to form a buoyant element therefrom; upward curved tangential wings secured on opposite sides of said body section; an auxiliary wing secured on the rear edge of said wings and curved upwardly from the line of attachment to said wings; a plurality of resilient strips secured to the rear edge of said auxiliary wings; ailerons pivoted in the tips of said first mentioned wings; means co-acting to change the angle of incidence of said ailerons; means to propel said device through the air, said means consisting of a plurality of propellers and a plurality of engines to drive said propellers.

10. A hydro-aeroplane consisting of a hollow body; tubes bent to form circular truss braces secured transversely therein; longitudinal tubes secured on said truss braces; tubes bent into arc form and secured on said circular truss braces; a water proof covering on a portion of said body adapted to form a buoyant element therefrom; wings secured on opposite sides of said body section consisting of a plane curved upward to form a concavity near the front edge thereof; an auxiliary wing provided on the rear edge of each of said planes and curved upward from the line of attachment to the plane; a plurality of resilient strips secure to the rear edge of said auxiliary wing, each parallel with said body and with their edges adjacent to form a plane therefrom; ailerons pivoted to the tips of said first mentioned wing; means to automatically change the angle of incidence of each of said ailerons, which means consist of a rock shaft journaled in said body section; a weighted pendulum provided on one end thereof; a segment gear secured on said rock shaft; a counter-shaft journaled adjacent said rock shaft; a pinion on said counter shaft the teeth of which mesh with the teeth of said segment gear; a drum fastened on said counter shaft; a cable partially wound and secured on said drum having its ends secured to a lever fastened on the pivot of each of said ailerons.

In testimony whereof I have affixed my signature in presence of two witnesses.

SAMUEL H. GILSON.

Witnesses:
 SAM RANEY,
 RUTH McINTOSH.